UNITED STATES PATENT OFFICE

LEO JAMES CLAPSADLE, OF BUFFALO, NEW YORK, ASSIGNOR TO CARBIDE & CARBON CHEMICALS CORPORATION, A CORPORATION OF NEW YORK

FOAM PREVENTION AGENT

No Drawing.   Application filed January 6, 1931.   Serial No. 507,045.

This invention relates to the prevention of foam formation by alcoholic solutions in liquid systems. The term alcohol as used in this specification and the appended claims is intended to include all the liquid saturated aliphatic hydroxy compounds. Typical illustrations of this class of substances are the mono-hydroxy alcohols, such as methanol, ethanol, propanol, etc., and the poly-hydroxy alcohols, such as ethylene glycol, diethylene glycol, propylene glycol, and glycerol.

The invention has especial applicability to the prevention of foam formation in the cooling systems of internal combustion engines, and particularly those wherein the solution used contains ethylene glycol and water in the proportions commonly employed as anti-freeze solutions. For purposes of illustration, the invention will be described as applied to this purpose, but it is not restricted thereto.

The presence of an alcohol, for example, ethylene glycol, in water results in the formation of a foam of considerable stability when the liquid is agitated, as by being circulated through a heating or cooling system. This foam collects around the over-flow pipe or safety vent of the system, passes out of the system and constitutes losses of considerable magnitude.

The object of this invention is to prevent foam formation by alcoholic solutions in liquid systems, and also to minimize solution losses from such systems incurred thereby.

In practicing the invention, it has been found that the addition of a salt of an alkaline earth metal, which yields substantially neutral aqueous solutions, diminishes the foaming of alcoholic solutions to a marked degree.

In a specific example, an anti-freeze solution containing 30% by volume of ethylene glycol, was found upon agitation to produce a foam lasting for 300 seconds after agitation was ceased. A quantity of calcium acetate equal to 0.02% of the weight of ethylene glycol in the solution was added to the anti-freeze solution. The solution was agitated as before and the duration of the foam was but 3 seconds. In the same manner it was found that foaming in all concentrations of ethylene glycol solutions was reduced to negligible proportions by the addition of calcium acetate.

The invention is not limited to the particular salt or amount thereof stipulated in the foregoing illustration. In general any soluble salt of an alkaline earth metal which produces substantially neutral aqueous solution may be used. Salts which hydrolyze excessively should be avoided in order that injurious corrosion will not be produced in the system. The useful amount of the salt to be added varies widely. It is usually necessary to have an amount of salt present in the solution equal to at least about 0.01% of the weight of alcohol in the solution and best results are obtained by using amounts varying between this minimum and an amount equal to about 0.1% of the weight of the alcohol in the solution.

I claim:

1. A composition of matter comprising an alcohol and calcium acetate.

2. A composition of matter comprising ethylene glycol and calcium acetate.

3. A composition of matter comprising from about 0.01% by weight to about 0.1% by weight calcium acetate, the balance being principally ethylene glycol.

4. A composition of matter comprising substantially 0.02% by weight calcium acetate, the balance being principally ethylene glycol.

5. The method of diminishing foaming of alcohol solutions which comprises adding calcium acetate to such alcohol solutions.

6. The method of diminishing foaming of ethylene glycol solutions which comprises adding calcium acetate to the solutions.

7. The method of diminishing foaming of ethylene glycol solutions which comprises adding to such solutions an amount of calcium acetate equal to from about 0.01% to about 0.1% of the weight of ethylene glycol in the solution.

8. A composition of matter comprising upwards of about 30% of an alcohol and a relatively small percentage of a soluble salt of an alkaline earth metal which yields a substantially neutral aqueous solution.

9. A composition of matter comprising upwards of about 30% of ethylene glycol and a relatively small percentage of a soluble salt of an alkaline earth metal which yields a substantially neutral aqueous solution.

10. The method of diminishing foaming of solutions containing upwards of about 30% of an alcohol which comprises adding to such solutions a relatively small percentage of a soluble salt of an alkaline earth metal which yields a substantially neutral aqueous solution.

11. The method of diminishing foaming of solutions containing upwards of about 30% of ethylene glycol which comprises adding to such solutions a relatively small percentage of a soluble salt of an alkaline earth metal which yields a substantially neutral aqueous solution.

In testimony whereof, I affix my signature.

LEO JAMES CLAPSADLE.